United States Patent
Golin et al.

(10) Patent No.: US 9,387,438 B2
(45) Date of Patent: Jul. 12, 2016

(54) MODULAR SYSTEM FOR REDUCTION OF SULPHUR OXIDES IN EXHAUST

(71) Applicant: Tenneco Automotive Operating Company Inc., Lake Forest, IL (US)

(72) Inventors: Michael Golin, Dexter, MI (US); Adam J. Kotrba, Laingsburg, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 372 days.

(21) Appl. No.: 14/180,616

(22) Filed: Feb. 14, 2014

(65) Prior Publication Data

US 2015/0231567 A1 Aug. 20, 2015

(51) Int. Cl.
  *B01D 53/94* (2006.01)

(52) U.S. Cl.
  CPC ............ *B01D 53/9495* (2013.01); *B01D 53/94* (2013.01); *Y02T 10/47* (2013.01)

(58) Field of Classification Search
  None
  See application file for complete search history.

(56) References Cited

U.S. PATENT DOCUMENTS

| | | | |
|---|---|---|---|
| 5,651,247 A | 7/1997 | Frankle | |
| 5,657,630 A | 8/1997 | Kjemtrup et al. | |
| 5,899,063 A | 5/1999 | Leistritz | |
| 5,954,553 A | 9/1999 | Ozawa et al. | |
| 6,120,335 A | 9/2000 | Nakase et al. | |
| 6,604,356 B1 | 8/2003 | Mills et al. | |
| 6,631,612 B1 | 10/2003 | Yasutake et al. | |
| 6,729,129 B2 | 5/2004 | Yamamoto et al. | |
| 6,779,339 B1 | 8/2004 | Laroo et al. | |
| 6,799,422 B2 | 10/2004 | Westerbeke, Jr. et al. | |
| 6,820,417 B2 | 11/2004 | May et al. | |
| 6,829,891 B2 | 12/2004 | Kato et al. | |
| 6,840,034 B2 | 1/2005 | Mills et al. | |
| 6,928,807 B2 | 8/2005 | Jacob et al. | |
| 6,945,036 B2 | 9/2005 | Kato et al. | |
| 7,213,565 B2 | 5/2007 | Grunaug et al. | |
| 7,258,710 B2 | 8/2007 | Caro et al. | |

(Continued)

FOREIGN PATENT DOCUMENTS

| | | |
|---|---|---|
| CH | 689687 A5 | 8/1999 |
| CN | 101104130 A | 1/2008 |

(Continued)

OTHER PUBLICATIONS

EGCSA Paper entitled "De-SOx via Scrubbers an Overview"; dated Sep. 14, 2012; 25 pages.

*Primary Examiner* — Walter D Griffin
*Assistant Examiner* — Jelitza Perez
(74) *Attorney, Agent, or Firm* — Harness, Dickey & Pierce, P.L.C.

(57) ABSTRACT

An engine exhaust after-treatment system including an exhaust passage including a plurality of legs, with an exhaust control valve being positioned at an inlet of each of the legs that is configured to control an amount of exhaust that enters each leg. A desulfurization treatment component is located within each of the legs. An alkaline reagent tank provides an alkaline reagent to the desulfurization treatment component, and a reagent control valve is disposed between the alkaline reagent tank and the desulfurization treatment component. The reagent control valve is configured to control an amount of alkaline reagent that enters the desulfurization component. A controller may be communication with each of the exhaust control valves and reagent control valves, wherein the controller is configured to control the exhaust control valves independently of the reagent control valves.

25 Claims, 4 Drawing Sheets

(56) References Cited

U.S. PATENT DOCUMENTS

| | | | |
|---|---|---|---|
| 7,275,366 | B2 | 10/2007 | Powell et al. |
| 7,278,259 | B2 | 10/2007 | Schmeichel et al. |
| 7,314,044 | B2 | 1/2008 | Westerbeke |
| 7,412,824 | B1 | 8/2008 | Newburry et al. |
| 7,418,818 | B2 | 9/2008 | Kato et al. |
| 7,430,857 | B2 | 10/2008 | Chandler et al. |
| 7,506,504 | B2 | 3/2009 | Kumar |
| 7,607,289 | B2 | 10/2009 | Schmeichel et al. |
| 7,713,492 | B2 | 5/2010 | Maus et al. |
| 7,744,837 | B2 | 6/2010 | Nissinen et al. |
| 7,757,676 | B2 | 7/2010 | Cracknell |
| 7,780,932 | B2 | 8/2010 | Canari et al. |
| 7,784,276 | B2 | 8/2010 | Ono |
| 7,934,371 | B2 | 5/2011 | Sugimoto |
| 7,976,809 | B2 | 7/2011 | Anttila et al. |
| 8,011,330 | B2 | 9/2011 | Randall |
| 8,015,806 | B2 | 9/2011 | Treiber |
| 8,038,493 | B1 | 10/2011 | Broman et al. |
| 8,038,774 | B2 | 10/2011 | Peng |
| 8,056,318 | B2 | 11/2011 | Chillar et al. |
| 8,066,950 | B2 | 11/2011 | Newburry et al. |
| 8,142,747 | B2 | 3/2012 | Andreasson et al. |
| 8,147,282 | B2 | 4/2012 | Levander |
| 8,153,549 | B2 | 4/2012 | Cho et al. |
| 8,225,600 | B2 | 7/2012 | Theis |
| 8,241,597 | B2 | 8/2012 | Chew |
| 8,316,639 | B2 | 11/2012 | Takahashi et al. |
| 8,323,600 | B2 | 12/2012 | Thogersen |
| 8,327,631 | B2 | 12/2012 | Caro et al. |
| 2006/0094312 | A1 | 5/2006 | Zwieg et al. |
| 2007/0240402 | A1 | 10/2007 | Andreasson et al. |
| 2008/0044318 | A1 | 2/2008 | Maus et al. |
| 2008/0196400 | A1 | 8/2008 | Treiber |
| 2008/0229733 | A1 | 9/2008 | Newburry et al. |
| 2009/0188782 | A1 | 7/2009 | Genuario et al. |
| 2009/0193780 | A1 | 8/2009 | Faka |
| 2009/0208393 | A1 | 8/2009 | Wenzel et al. |
| 2010/0130079 | A1 | 5/2010 | White et al. |
| 2010/0199646 | A1 | 8/2010 | Andreasson et al. |
| 2010/0224062 | A1 | 9/2010 | Patterson et al. |
| 2010/0224070 | A1 | 9/2010 | Patterson et al. |
| 2010/0229540 | A1 | 9/2010 | Waggoner et al. |
| 2010/0230506 | A1 | 9/2010 | Henriksson |
| 2010/0266472 | A1 | 10/2010 | Peng |
| 2010/0319324 | A1 | 12/2010 | Mital |
| 2011/0011068 | A1 | 1/2011 | Ren et al. |
| 2011/0023490 | A1 | 2/2011 | Henriksson et al. |
| 2011/0023765 | A1 | 2/2011 | Henriksson et al. |
| 2011/0203456 | A1 | 8/2011 | Hakansson |
| 2012/0011834 | A1 | 1/2012 | Sobue |
| 2012/0036832 | A1 | 2/2012 | Hoy-Petersen et al. |
| 2012/0060473 | A1 | 3/2012 | Turpin et al. |
| 2012/0107202 | A1 | 5/2012 | Canari et al. |
| 2012/0204542 | A1* | 8/2012 | Norris ............... F01N 3/2066 60/274 |
| 2012/0210697 | A1 | 8/2012 | Garimella et al. |
| 2012/0216515 | A1 | 8/2012 | Norton et al. |
| 2012/0224998 | A1 | 9/2012 | Lee et al. |
| 2012/0260634 | A1 | 10/2012 | Devarakonda et al. |
| 2012/0260800 | A1 | 10/2012 | Suominen |
| 2012/0269705 | A1 | 10/2012 | Jensen et al. |
| 2012/0275980 | A1 | 11/2012 | Canari et al. |
| 2012/0279201 | A1 | 11/2012 | Flynn |
| 2012/0285139 | A1 | 11/2012 | Geyer |
| 2012/0304887 | A1 | 12/2012 | Gokhale |
| 2013/0008528 | A1 | 1/2013 | Mitsuda et al. |
| 2013/0052111 | A1 | 2/2013 | Chew |

FOREIGN PATENT DOCUMENTS

| | | | |
|---|---|---|---|
| CN | 101171070 | A | 4/2008 |
| CN | 201073586 | Y | 6/2008 |
| CN | 101314106 | A | 12/2008 |
| CN | 101553648 | A | 10/2009 |
| CN | 101757846 | A | 6/2010 |
| CN | 101810994 | A | 8/2010 |
| CN | 101822937 | A | 9/2010 |
| CN | 101922333 | A | 12/2010 |
| CN | 201686529 | U | 12/2010 |
| CN | 201692764 | U | 1/2011 |
| CN | 101972605 | A | 2/2011 |
| CN | 201728054 | U | 2/2011 |
| CN | 201744291 | U | 2/2011 |
| CN | 101982220 | A | 3/2011 |
| CN | 201778871 | U | 3/2011 |
| CN | 201778872 | U | 3/2011 |
| CN | 201778873 | U | 3/2011 |
| CN | 201815246 | U | 5/2011 |
| CN | 201815247 | U | 5/2011 |
| CN | 102107109 | A | 6/2011 |
| CN | 102120126 | A | 7/2011 |
| CN | 102120138 | A | 7/2011 |
| CN | 102151481 | A | 8/2011 |
| CN | 102151482 | A | 8/2011 |
| CN | 102159455 | A | 8/2011 |
| CN | 201940168 | U | 8/2011 |
| CN | 102172474 | A | 9/2011 |
| CN | 202044900 | U | 11/2011 |
| CN | 202044901 | U | 11/2011 |
| CN | 202044902 | U | 11/2011 |
| CN | 102274682 | A | 12/2011 |
| CN | 102309912 | A | 1/2012 |
| CN | 102337948 | A | 2/2012 |
| CN | 102363091 | A | 2/2012 |
| CN | 102363092 | A | 2/2012 |
| CN | 102363098 | A | 2/2012 |
| CN | 102363099 | A | 2/2012 |
| CN | 102363100 | A | 2/2012 |
| CN | 102364068 | A | 2/2012 |
| CN | 202191840 | U | 4/2012 |
| CN | 102463015 | A | 5/2012 |
| CN | 102472139 | A | 5/2012 |
| CN | 102588048 | A | 7/2012 |
| CN | 102597479 | A | 7/2012 |
| CN | 102695855 | A | 9/2012 |
| CN | 102698583 | A | 10/2012 |
| CN | 102741514 | A | 10/2012 |
| CN | 102812221 | A | 12/2012 |
| CN | 102840016 | A | 12/2012 |
| CN | 102840017 | A | 12/2012 |
| CN | 102840018 | A | 12/2012 |
| CN | 202596844 | U | 12/2012 |
| CN | 202628242 | U | 12/2012 |
| CN | 102852600 | A | 1/2013 |
| CN | 102852604 | A | 1/2013 |
| CN | 102852608 | A | 1/2013 |
| DE | 4014388 | A1 | 11/1990 |
| DE | 4023030 | A1 | 1/1991 |
| DE | 19731926 | C1 | 1/1999 |
| DE | 19819579 | C1 | 9/1999 |
| DE | 10206028 | A1 | 8/2003 |
| DE | 102005057207 | A1 | 6/2007 |
| DE | 102007040934 | A1 | 3/2009 |
| DE | 102008018522 | A1 | 10/2009 |
| DE | 102008061222 | A1 | 6/2010 |
| DE | 102009015625 | A1 | 10/2010 |
| DE | 102009017936 | A1 | 10/2010 |
| DE | 102010009946 | A1 | 9/2011 |
| DE | 102010017563 | A1 | 12/2011 |
| DE | 102010042035 | A1 | 4/2012 |
| DE | 102011002987 | A1 | 7/2012 |
| DE | 102011005654 | A1 | 9/2012 |
| DE | 102011015513 | A1 | 10/2012 |
| DE | 102012203574 | A1 | 12/2012 |
| EP | 558452 | A1 | 9/1993 |
| EP | 779415 | A1 | 6/1997 |
| EP | 1108460 | A1 | 6/2001 |
| EP | 1681446 | A2 | 7/2006 |
| EP | 1785604 | A1 | 5/2007 |
| EP | 1985353 | A1 | 10/2008 |
| EP | 2270328 | A1 | 1/2011 |
| EP | 2465602 | A2 | 6/2012 |
| EP | 2514512 | A1 | 10/2012 |

(56) References Cited

FOREIGN PATENT DOCUMENTS

| | | |
|---|---|---|
| EP | 2527610 A1 | 11/2012 |
| EP | 2527611 A1 | 11/2012 |
| JP | 2009240908 A | 10/2009 |
| JP | 2010069999 A | 4/2010 |
| JP | 2010071148 A | 4/2010 |
| JP | 2010071150 A | 4/2010 |
| JP | 2010185335 A | 8/2010 |
| JP | 2011144766 A | 7/2011 |
| JP | 2011149329 A | 8/2011 |
| JP | 2011252447 A | 12/2011 |
| JP | 2012047094 A | 3/2012 |
| JP | 2012047095 A | 3/2012 |
| JP | 2012047096 A | 3/2012 |
| JP | 2012082804 A | 4/2012 |
| JP | 2012180772 A | 9/2012 |
| SE | 1250004 A1 | 1/2012 |
| WO | WO-9208541 A1 | 5/1992 |
| WO | WO-9429587 A1 | 12/1994 |
| WO | WO-0106098 A1 | 1/2001 |
| WO | WO-0249912 A1 | 6/2002 |
| WO | WO-2007054615 A1 | 5/2007 |
| WO | WO-2008077408 A1 | 7/2008 |
| WO | WO-2008104070 A1 | 9/2008 |
| WO | WO-2009125050 A1 | 10/2009 |
| WO | WO-2009125052 A1 | 10/2009 |
| WO | WO-2010020684 A1 | 2/2010 |
| WO | WO-2010032739 A1 | 3/2010 |
| WO | WO-2010041243 A1 | 4/2010 |
| WO | WO-2010073240 A1 | 7/2010 |
| WO | WO-2010092855 A1 | 8/2010 |
| WO | WO-2010105620 A1 | 9/2010 |
| WO | WO-2011002055 A1 | 1/2011 |
| WO | WO-2011023848 A1 | 3/2011 |
| WO | WO-2011053013 A2 | 5/2011 |
| WO | WO-2011087031 A1 | 7/2011 |
| WO | WO-2011090025 A1 | 7/2011 |
| WO | WO-2012026387 A1 | 3/2012 |
| WO | WO-2012026512 A1 | 3/2012 |
| WO | WO-2012041455 A1 | 4/2012 |
| WO | WO-2012050202 A1 | 4/2012 |
| WO | WO-2012060155 A1 | 5/2012 |
| WO | WO-2012081290 A1 | 6/2012 |
| WO | WO-2012090557 A1 | 7/2012 |
| WO | WO-2012096123 A1 | 7/2012 |
| WO | WO-2012108796 A1 | 8/2012 |
| WO | WO-2012127127 A1 | 9/2012 |
| WO | WO-2012130375 A1 | 10/2012 |
| WO | WO-2012133764 A1 | 10/2012 |
| WO | WO-2012147376 A1 | 11/2012 |

* cited by examiner

MODULAR SYSTEM FOR REDUCTION OF SULPHUR OXIDES IN EXHAUST

FIELD

The present disclosure relates to a modular exhaust after-treatment system for the reduction of sulfur oxides in an engine exhaust.

BACKGROUND

This section provides background information related to the present disclosure which is not necessarily prior art.

Combustion engines are known to produce emissions that may be harmful to the environment. In an effort to decrease the environmental impact that an engine may have, exhaust after-treatment systems have undergone comprehensive evaluation and development. Various components that assist in treating engine emission include oxidation and reduction catalysts. Dependent on the size of the engine application, the cost of these components can increase greatly. In this regard, larger engine applications such as locomotive, marine, and large horsepower stationary applications can produce substantially more exhaust emissions than, for example, a tractor trailer engine application. The exhaust after-treatment systems, therefore, are generally larger in scale to satisfactorily reduce the harmful emissions produced by these large-scale applications. As the scale of the after-treatment system increases, however, the cost to produce, install, and service such a system increases greatly. It is desirable, therefore, to produce an exhaust after-treatment system that is more conventional in scale, while still being able to reduce the effects of harmful emissions emitted by large engine applications.

SUMMARY

This section provides a general summary of the disclosure, and is not a comprehensive disclosure of its full scope or all of its features.

The present disclosure provides an engine exhaust after-treatment system including an exhaust passage including a plurality of legs, with an exhaust control valve being positioned at an inlet of each of the legs. The exhaust control valves are configured to control an amount of exhaust that enter each leg. A first exhaust treatment component located within each of the legs, and a desulfurization treatment component located within each of the legs downstream from the first exhaust treatment component. An alkaline reagent tank provides an alkaline reagent to the desulfurization treatment component, and a reagent control valve is disposed between the alkaline reagent tank and the desulfurization treatment component. The reagent control valve is configured to control an amount of alkaline reagent that enters the desulfurization component. A controller may be communication with each of the exhaust control valves and reagent control valves, wherein the controller is configured to control the exhaust control valves independently of the reagent control valves.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
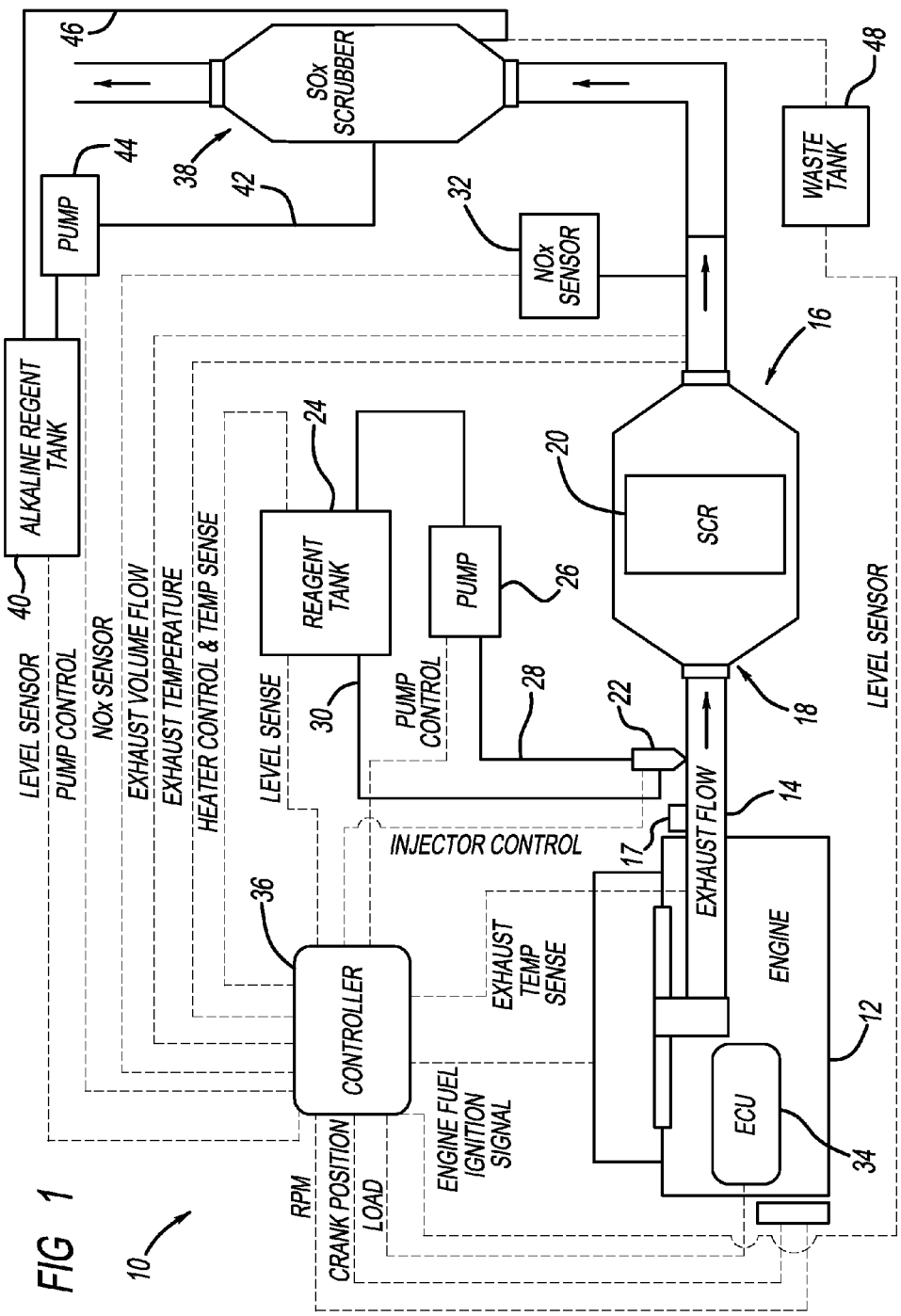
FIG. 1 is a schematic representation of an exhaust after-treatment system according to a principle of the present disclosure.

FIG. 1 schematically illustrates an exhaust system 10 according to the present disclosure. Exhaust system 10 can include at least an engine 12 in communication with a fuel source (not shown) that, once consumed, will produce exhaust gases that are discharged into an exhaust passage 14 having an exhaust after-treatment system 16. Downstream from engine 12 can be disposed a first exhaust treatment component 18, which can be a diesel oxidation catalyst (DOC), a particulate filter (DPF) component, or, as illustrated, a selective catalytic reduction (SCR) component 20. Although not required by the present disclosure, exhaust after-treatment system 16 can further include components such as a thermal enhancement device or burner 17 to increase a temperature of the exhaust gases passing through exhaust passage 14. Increasing the temperature of the exhaust gas is favorable to achieve light-off of the catalyst in the exhaust treatment component 18 in cold-weather conditions and upon start-up of engine 12, as well as initiate regeneration of the exhaust treatment component 18 when the exhaust treatment component 18 is a DPF.

To assist in reduction of the emissions produced by engine 12, exhaust after-treatment system 16 can include a dosing module 22 for periodically dosing an exhaust treatment fluid into the exhaust stream. As illustrated in FIG. 1, dosing module 22 can be located upstream of exhaust treatment component 18, and is operable to inject an exhaust treatment fluid into the exhaust stream. In this regard, dosing module 22 is in fluid communication with a reagent tank 24 and a pump 26 by way of inlet line 28 to dose an exhaust treatment fluid such as diesel fuel or urea into the exhaust passage 14 upstream of exhaust treatment component 18. Dosing module 22 can also be in communication with reagent tank 24 via return line 30. Return line 30 allows for any exhaust treatment fluid not dosed into the exhaust stream to be returned to reagent tank 24. Flow of the exhaust treatment fluid through inlet line 28, dosing module 22, and return line 30 also assists in cooling dosing module 22 so that dosing module 22 does not overheat.

The amount of exhaust treatment fluid required to effectively treat the exhaust stream may vary with load, engine speed, exhaust gas temperature, exhaust gas flow, engine fuel injection timing, desired $NO_x$ reduction, barometric pressure, relative humidity, EGR rate and engine coolant temperature. A $NO_x$ sensor or meter 32 may be positioned downstream from SCR 20. $NO_x$ sensor 32 is operable to output a signal indicative of the exhaust $NO_x$ content to an engine electronic control unit (ECU) 34. All or some of the engine operating parameters may be supplied from ECU 34 via the engine/vehicle databus to exhaust after-treatment system controller 36. The controller 36 could also be included as part of the ECU 34. Exhaust gas temperature, exhaust gas flow and exhaust back pressure and other vehicle operating parameters may be measured by respective sensors, as indicated in FIG. 1.

A second exhaust treatment component 38 may be positioned downstream from first exhaust treatment component 18. Second exhaust treatment component 38 may be a DOC, DPF, ammonia-slip catalyst, or as illustrated, a desulfurization component. Desulfurization component (hereinafter "scrubber") 38 chemically scrubs the exhaust to remove sulfur oxides. An alkaline reagent tank 40 provides an alkaline reagent such as, for example, sodium hydroxide (NaOH) to scrubber 38. The alkaline reagent is fed to scrubber 38 through feed line 42 using a pump 44. Scrubber 28 may be vertically oriented such that the alkaline reagent may collect at a bottom of scrubber 38. A return line 46 may return the collected alkaline reagent back to reagent tank 40. Alternatively, the collected alkaline reagent may be fed to a waste tank 48, where the alkaline reagent may be treated and reused, or disposed of.

If engine 12 is used on a marine vessel, the alkaline reagent used may be seawater. In such an application, pump 44 would communicate seawater to desulfurization tank 38. The seawater that collects at a bottom of scrubber 38 may then be fed to waste tank 48. Alternatively, the collected seawater may be treated to remove any contaminants and returned to the sea.

Figure 2:
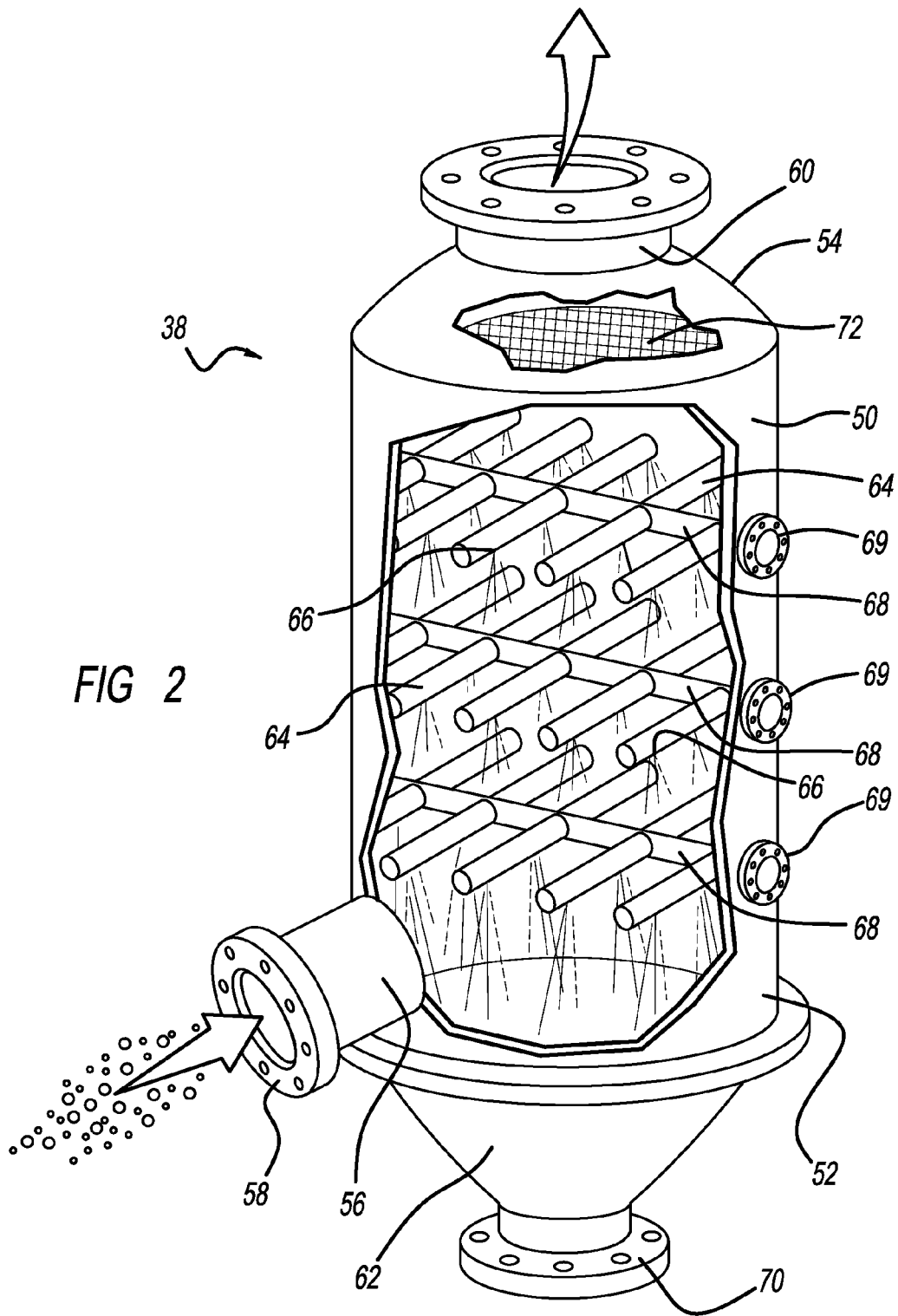
FIG. 2 is a perspective view of a desulfurization component according to a principle of the present disclosure.

FIG. 2 illustrates an exemplary scrubber 38. Scrubber includes a shell 50. Shell 50 may be cylindrical including a first (bottom) end 52 and a second (top) end 54. Although shell 50 is illustrated as being cylindrical, shell 50 may be any other shape known to one skilled in the art. An inlet 56 may be positioned proximate first end 52. Inlet 56 communicates with exhaust passage 14. A flange 58 may be used to couple inlet 56 to exhaust passage 14. An outlet 60 may be positioned proximate second end 54. As illustrated, outlet 60 may be aligned with an axis of shell 50. It should be understood, however, that outlet 60 is not required to be aligned with the axis of shell 50.

A collection reservoir 62 may be fixed to first end 52. Collection reservoir 62 is for collecting the alkaline reagent that is sprayed into the exhaust stream. A plurality of nozzle lines 64 are positioned within shell 50. Each nozzle line 64 includes a plurality of nozzles 66. Nozzle lines 64, as illustrated, may extend orthogonal to feed passages 68. Feed passages 68 may be coupled to feed lines 42 at couplings 69, which supply feed passages 68 with alkaline reagent from alkaline reagent tank 40. As the engine exhaust comes into contact with the alkaline reagent, the sulfur oxides (SOx) in the exhaust stream undergo reaction with the alkaline reagents to form aqueous or solid reaction by-products such as sulfites and sulfates. These by-products, along with unreacted alkaline reagent, collect in collection reservoir 62. As shown in FIG. 2, collection reservoir 62 includes a connection flange 70 for connecting to return line 46, which either returns the alkaline reagent back to alkaline reagent tank 40, or sends the collected reagent to waste tank 48. Although not illustrated in FIG. 2, it should be understood that beds of plastic beads may be positioned between first end 52 and 54 that, when showered with the alkaline reagent, provide a greater surface area for the alkaline reagent to contact and treat the exhaust as the exhaust passes through scrubber 38 in comparison to simply passing the exhaust through the misting alkaline reagent emitted from nozzles 66.

A mist eliminator 72 in the form of a fine mesh screen may be located within shell 50 proximate second end 54. As the hot exhaust gases come into contact with the cooler alkaline reagent, a fine mist of droplets may develop. The droplets may contain the sulfur by-products that are desired to be removed from the engine exhaust. As the droplets pass through mist eliminator 72, the droplets may adhere to mist eliminator and eventually fall into the collection reservoir. Although mist eliminator 72 is illustrated and described as being a fine mesh screen, it should be understood that any type of droplet adhesion device may be used. For example, a plurality of blades may be positioned within shell 50, without departing from the scope of the present disclosure.

The amount of exhaust treatment fluid required to effectively treat the exhaust stream can also be dependent on the size of the engine 12. In this regard, large-scale diesel engines used in locomotives, marine applications, and stationary applications can have exhaust flow rates that exceed the capacity of a single dosing module 22, single SCR 20, and single scrubber 38. Accordingly, although only a single dosing module 22 and single SCR 20 are illustrated for treating the engine exhaust, it should be understood that multiple dosing modules 22 and multiple SCR components 20 are contemplated by the present disclosure. Similarly, multiple scrubbers 38 may be used.

Figure 3:
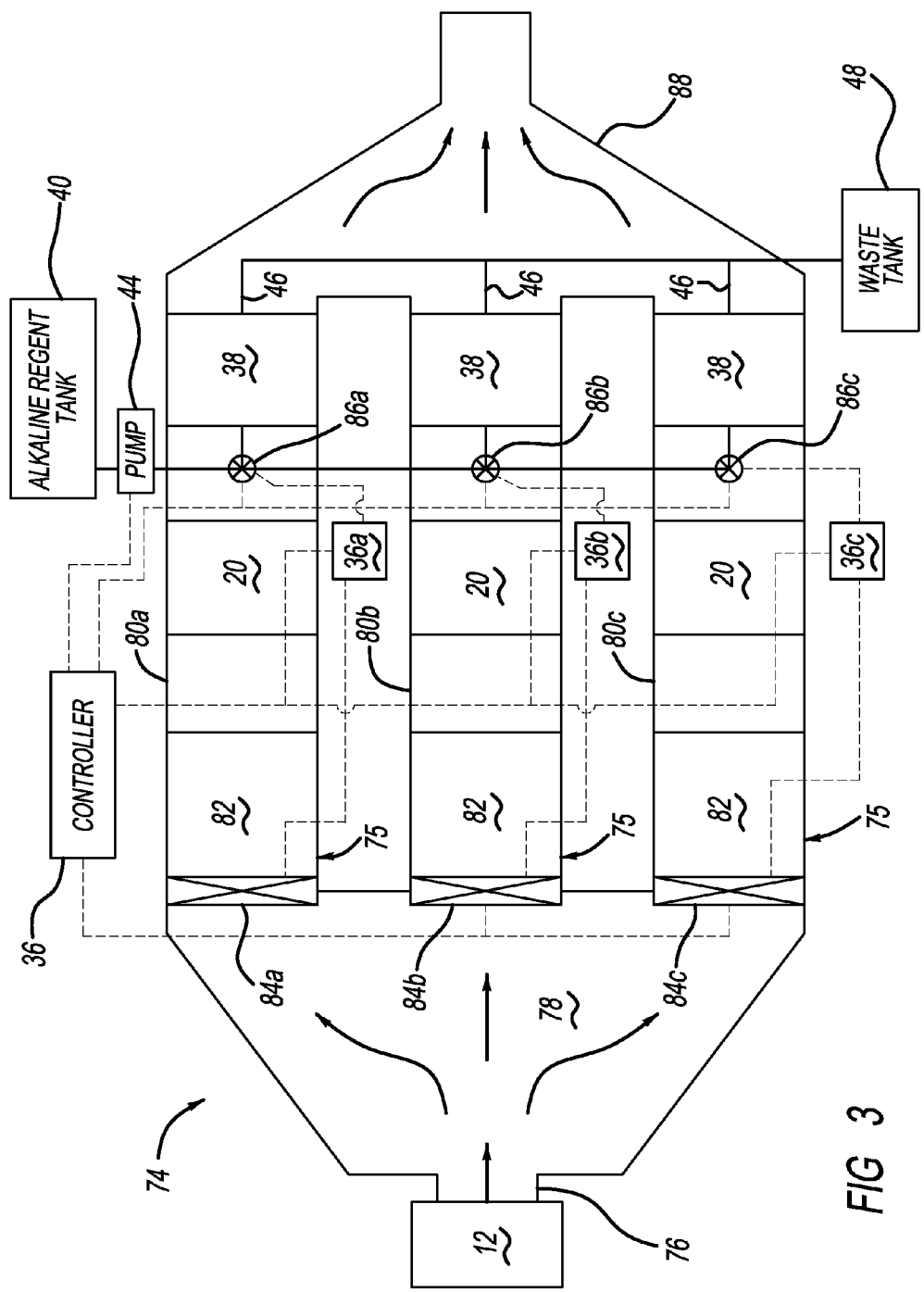
FIG. 3 is a schematic representation of an exhaust after-treatment system including multiple legs according to a principle of the present disclosure.

FIG. 3 schematically illustrates a multi-leg exhaust after-treatment system 74. Multi-leg exhaust after-treatment system 74 is in communication with a large-scale engine 12 that produces relatively large mass flow rates of exhaust. Large-scale engine 12 can be an engine used in, for example, locomotive, stationary, and marine applications. Although only a single engine 12 is illustrated, it should be understood that multi-leg exhaust after-treatment system 74 can be scaled to receive exhaust from multiple engines 12, if desired.

Exhaust produced by engine 12 enters an exhaust passage 76 that may include a turbo manifold 78. At turbo manifold 78, the exhaust can be divided into a plurality of legs 80a-80c. It should be understood that although only three legs 80a-80c are illustrated in FIG. 3, the present disclosure should not be limited thereto. In this regard, multi-leg exhaust treatment system 74 can include a pair of legs 80, or a number of legs 80 greater than the three illustrated in FIG. 3. Further, although the above description references large-scale engines that produce large amounts of exhaust, the present disclosure is equally applicable to smaller-scale engines used on, for example, passenger vehicles, tractors, and the like.

Each leg 80a-80c can be configured to include a catalyst-coated DPF 82, SCR 20, and scrubber 38. Each leg 80a-80c can include a respective burner (not shown) for increasing a temperature of the exhaust stream to achieve light-off of catalysts in DPF 82 and SCR 20, as well as regenerate DPF 82, when necessary. Additionally, each leg 80a-80c can include injectors (not shown) for injecting exhaust treatment fluids such as hydrocarbon and urea treatment fluids at positions upstream of DPF 82 and SCR 20, respectively. Lastly, similar to after-treatment system 16, each injector, as well as each burner can be in communication with controller 36 that is operable to control injection of the exhaust treatment fluids into the exhaust stream, as well as control operation of burner for each leg 80a-80c. It should be understood that although each leg 80a-80c is illustrated as having a catalyst-coated DPF 82, the present disclosure should not be limited thereto. In this regard, scrubber 38 can also remove particulate matter from the exhaust such that DPF 82 is not required. In such an instance, DPF 82 may be replaced in favor of a diesel oxidation catalyst (DOC) or omitted.

The use of multiple legs 80a-80c allows components such as DPF 82, SCR 20, and scrubber 38 to be scaled down, which reduces the overall cost to manufacture exhaust after-treatment system 74. In addition, because different numbers of legs 80 may be used, the after-treatment system 74 can be specifically tailored to the engine 12 being used. In other words, after-treatment system 74 can be modular in design, with each leg 80a-80c defining a sub-after-treatment system 75. Each sub-after-treatment system 75 may include a sub-controller 36a-36c, with each sub-controller 36a-36c communicating with controller 36 and the other sub-controllers 36a-36c. With such a configuration, if one of the sub-controllers 36a-36c fails, controller 36 may continue to operate the sub-after-treatment system 75 including the defective controller 36a-36c. Alternatively, if controller 36 fails, after-treatment system 74 may be designed such that the duties of controller 36 may be divided between sub-controllers 36a-36c.

Each sub-after-treatment system 75 may include exhaust control valves 84a-84c for allowing various legs 80a-80c to be closed and opened, as needed. Exhaust control valves 84a-84c may be in communication with controller 36 such that controller 36 can open and close exhaust control valves 84a-84c in response to various engine operating conditions, and may also be in communication with the particular sub-controller 36a-36c, respectively, that is associated with that particular leg 80a-80c. For example, if engine 12 is running at idle or lower loads, only a single leg 80b or a pair of legs 80a and 80c may be required to adequately treat the engine exhaust. The legs 80a-80c not being used, therefore, may be closed by closing the particular exhaust control valve 84a-84c for that particular leg 80a-80c. Moreover, if a component such as DPF 82, SCR 20, or scrubber 38 needs to be serviced in a particular leg 80a-80c, the exhaust flow can be prevented from entering that particular leg 80a-80c by closing the associated exhaust control valve 84a-84c.

As noted above, alkaline reagent tank 40 is in communication with scrubbers 38 by way of feed lines 42. Each scrubber 38 may be in communication with waste tank 48 by return lines 46. Return lines 46 are preferably gravity-assisted, but a pump (not shown) may be in communication with each return line 46 to feed waste tank 48. To prevent the unnecessary feeding of the alkaline reagent to scrubbers 38 when a particular leg 80a-80c is not in use, feed lines 40 may include valves 86a-86c therein at each scrubber 38. Valves 86a-86c may be controlled by controller 36 or sub-controllers 36a-36c such that if controller 36 or sub-controllers 36a-36c closes a particular exhaust control valve 84a-84c for a leg 80a-80c, controller 36 or sub-controller 36a-36c may also close the valve 86a-86c associated with the scrubber 38 in the closed leg 80a-80c. In this manner, no alkaline reagent is permitted to be fed to the scrubber 38 not being used so that no fresh alkaline reagent is improperly drained to waste tank 48. It should also be understood that a reagent purification apparatus may be positioned upstream from waste tank 48 that can purify used alkaline reagent and return the purified alkaline reagent to alkaline reagent tank 40, with any waste material being passed to waste tank 48, as is known in the art.

In another aspect of the present disclosure, valves 86a-86c may be controlled independently from exhaust control valves 84a-84c. That is, although the engine exhaust may be free to pass through scrubber 38, the feeding of alkaline reagent thereto may be prevented by closing the valve 86a-86c associated with that scrubber 38. Such a scenario may be desired in marine applications were desulfurization is not required when the vessel is far enough out to sea that no emission regulations are in effect or reduced. In this regard, if the vessel is travelling in a region where desulfurization is not required, controller 36 or sub-controller 36a-36c may instruct valves 86a-86c to close. Then, although the exhaust may be free to flow through scrubber 38, no alkaline reagent may be sprayed into the exhaust stream to remove SOx.

Figure 4:
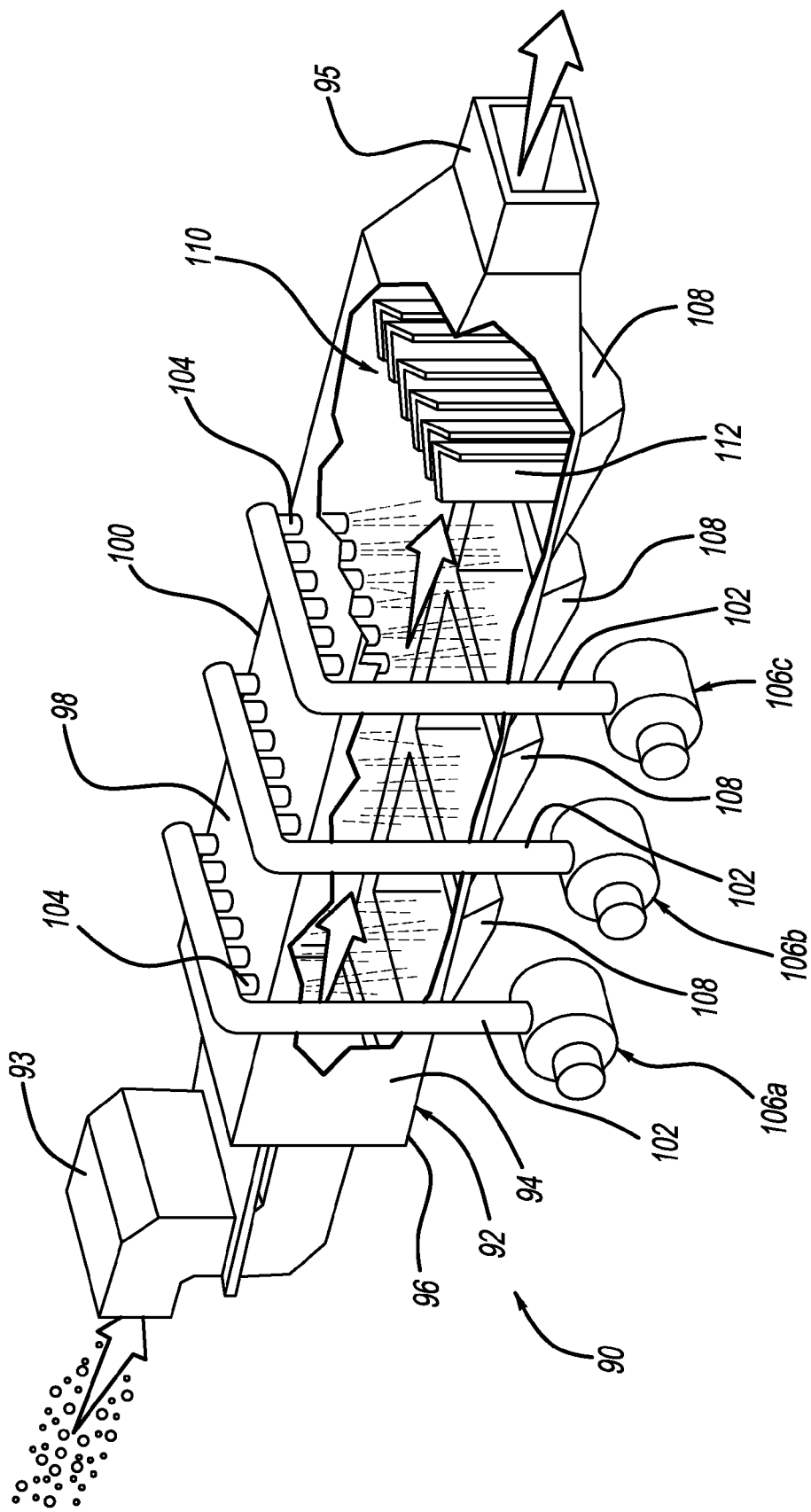
FIG. 4 is a perspective view of another desulfurization component according to a principle of the present disclosure.

After the exhaust passes through scrubbers 38, the exhaust may travel into an outlet manifold 88. If scrubbers 38 are vertically oriented, outlet manifold may be vertically oriented as well. Alternatively, if scrubbers 38 are horizontally oriented, outlet manifold 88 may horizontally oriented as well. FIG. 4 illustrates an exemplary horizontal scrubber 90 that may be used in accordance with the present disclosure. Scrubber 90 includes a horizontally oriented housing 92 including an inlet 93 and an outlet 95. Housing 92 is illustrated as being parallelepiped having first, second, third, and fourth side panels 94, 96, 98, and 100, but may be cylindrical as well without departing from the scope of the present disclosure.

A plurality of feed passages 102 each including a plurality of nozzles 104 inject alkaline reagent into housing 92. Feed passages 102 receive the alkaline reagent from feed lines 42 (not shown). Similar to scrubber 38, valves 106 may be located between feed lines 42 (not shown) and feed passages 102. In the illustrated embodiment, a plurality of valves 106 may be used for each scrubber 90. Valves 106 may be controlled by controller 36 or sub-controllers 36a-36c such that if controller 36 or sub-controller 36a-36c closes a particular exhaust control valve 84a-84c for a leg 80a-80c, controller 36 or sub-controller 36a-36c may also close the valves 106 associated with the scrubber 90 in the closed leg 80a-80c. In this manner, no alkaline reagent is permitted to be fed to the scrubber 90 that is not being used so that no fresh alkaline reagent is improperly drained to waste tank 48. A plurality of collection reservoirs 108 may be positioned at an underside (i.e, panel 96) of housing 92. Collection reservoirs 108 collect the alkaline reagent injected into housing 92. A plurality of return lines (not shown) may feed the used alkaline reagent to waste tank 48 (not shown).

Valves 106 may be controlled independently from exhaust control valves 84a-84c. That is, although the engine exhaust may be free to pass through scrubber 90, the feeding of alkaline reagent thereto may be prevented by closing the valve 106 associated with that scrubber 90. Then, although the exhaust may be free to flow through scrubber 90, no alkaline reagent may be sprayed into the exhaust stream to remove SOx.

A mist eliminator 110 may be positioned downstream from nozzles 104. Mist eliminator 110 includes a plurality of blades 112 that allow mist droplets of the alkaline reagent to adhere thereto and eventually fall into one of collection reservoirs 108. Although mist eliminator 110 is illustrated and described as including blades 112, it should be understood that any type of droplet adhesion device may be used. For example, mist eliminator 110 may be a fine mesh screen like mist eliminator 72 described in conjunction with scrubber 38. After passing through mist eliminator 110, the engine exhaust is free to enter outlet manifold 88 and exit after-treatment system 74.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. An engine exhaust after-treatment system, comprising:
an exhaust passage including a plurality of legs;

an exhaust control valve positioned at an inlet of each of the legs, and configured to control an amount of exhaust that enters the leg;

a first exhaust treatment component located within each of the legs;

a desulfurization treatment component located within each of the legs downstream from the first exhaust treatment component;

an alkaline reagent tank configured to provide an alkaline reagent to the desulfurization treatment component;

a reagent control valve disposed between the alkaline reagent tank and the desulfurization treatment component, and configured to control an amount of alkaline reagent that enters the desulfurization component; and a controller in communication with each of the exhaust control valves and reagent control valves, wherein the controller is configured to control the exhaust control valves independently of the reagent control valves.

2. The after-treatment system of claim 1, wherein the controller is configured to selectively close legs of the after-treatment system dependent on an engine condition by closing the respective exhaust control valves.

3. The after-treatment system of claim 2, wherein if one of the legs is closed by the controller, the reagent control valve of the one leg is also closed by the controller.

4. The after-treatment system of claim 1, wherein the controller is operable to close the reagent control valves independent of the legs being open or closed.

5. The after-treatment system of claim 1, wherein the desulfurization component includes a feed passage in communication with the reagent control valves, and a plurality of nozzles are formed in the feed passage to inject the alkaline reagent into the desulfurization component.

6. The after-treatment system of claim 1, wherein the desulfurization component includes a mist eliminator.

7. The after-treatment system of claim 1, wherein the first exhaust treatment component is a selective catalytic reduction (SCR) component.

8. The after-treatment system of claim 7, further comprising a dosing module configured to inject an exhaust treatment fluid into the engine exhaust, the dosing module communicating with the controller to control an amount of the exhaust treatment fluid being dosed into the engine exhaust, and the dosing module being located upstream from the first exhaust treatment component.

9. The after-treatment system of claim 1, further comprising a third exhaust treatment component positioned within each of the legs.

10. The after-treatment system of claim 9, wherein the third exhaust treatment component is a catalyst-coated particulate filter.

11. The after-treatment system of claim 1, wherein the desulfurization component is oriented orthogonal relative to the exhaust passage.

12. The after-treatment system of claim 1, wherein the desulfurization component is oriented parallel relative to the exhaust passage.

13. The after-treatment system of claim 1, wherein each leg includes a sub-controller in communication with the controller.

14. The after-treatment system of claim 13, wherein the sub-controller of one of the legs is in communication with the exhaust control valve and reagent control valve associated with the one leg.

15. An engine exhaust after-treatment system, comprising:

an exhaust passage including a plurality of legs, each of the legs being operable to receive a portion of the engine exhaust;

a plurality of first exhaust treatment components, each of the legs including one of the first exhaust treatment components;

a plurality of second exhaust treatment components, each of the legs including one of the second exhaust treatment components;

wherein the second exhaust treatment component is a desulfurization component a first reagent tank for providing a first exhaust treatment reagent for use in conjunction with the plurality of first exhaust treatment components;

a second reagent tank for providing a second exhaust treatment reagent for use in conjunction with the plurality of second exhaust treatment components;

a plurality of exhaust control valves operable to open and close each of the legs;

a plurality of reagent control valves for controlling an amount of the second exhaust treatment reagent for use with the second exhaust treatment components; and a controller in communication with each of the exhaust control valves and reagent control valves, the controller operable to open and close each of the exhaust control valves and reagent control valves, wherein if the controller closes one of the exhaust control valves to prevent flow of the engine exhaust through one of the legs, the controller simultaneously closes one of the reagent control valves associated with the one leg.

16. The after-treatment system of claim 15, wherein the controller is operable to close the reagent control valves independent of the exhaust control valves.

17. The after-treatment system of claim 16, wherein the controller is operable to close the reagent control valves while the exhaust control valves are open.

18. The after-treatment system of claim 15, wherein the second exhaust treatment reagent is an alkaline reagent.

19. The after-treatment system of claim 15, wherein the second exhaust treatment components are positioned downstream from the first exhaust treatment components.

20. The after-treatment system of claim 15, wherein first exhaust treatment components are selective catalytic reduction (SCR) catalysts.

21. The after-treatment system of claim 15, further comprising a plurality of third exhaust treatment components, the third exhaust treatment components being catalyst-coated particulate filters.

22. The after-treatment system of claim 15, wherein the desulfurization component includes a housing and a plurality of nozzles for dispersing the second exhaust treatment reagent.

23. The after-treatment system of claim 22, further comprising a waste tank for receiving used second exhaust treatment reagent.

24. The after-treatment system of claim 15, wherein each leg includes a sub-controller in communication with the controller.

25. The after-treatment system of claim 24, wherein the sub-controller of one of the legs is in communication with the exhaust control valve and reagent control valve associated with the one leg.

* * * * *